United States Patent [19]

Silken

[11] 4,323,100
[45] Apr. 6, 1982

[54] ROUTER GUIDE

[76] Inventor: Howard Silken, 8676 Bridle Path Ct., Davie, Fla. 33328

[21] Appl. No.: 275,066

[22] Filed: Jun. 18, 1981

Related U.S. Application Data

[62] Division of Ser. No. 129,175, Mar. 10, 1980, Pat. No. 4,291,735.

[51] Int. Cl.³ .................................................. B27C 5/10
[52] U.S. Cl. ................................. 144/134 D; 33/27 L; 409/182
[58] Field of Search .......... 144/134 R, 134 D, 136 R, 144/136 C, 323; 51/170 R, 170 PT; 409/182; 145/129; 33/27 L

[56] References Cited

U.S. PATENT DOCUMENTS

| | | | |
|---|---|---|---|
| 3,635,268 | 1/1972 | Lange | 144/134 D |
| 4,143,691 | 3/1979 | Robinson | 144/134 D |
| 4,294,297 | 10/1981 | Kieffer | 144/134 D |

*Primary Examiner*—W. D. Bray
*Attorney, Agent, or Firm*—Oltman and Flynn

[57] ABSTRACT

The present router guide has a guide plate for attachment to the base of a router with a central opening for passing the router bit. On the bottom, the guide plate has a series of openings spaced apart along a spiral of progressively increasing radius which has the central opening as its center. A pivot pin is selectively insertable into any one of these openings. This pivot pin has a pointed end for insertion in a workpiece at the center of a circular groove which is to be cut in the workpiece by the router bit as the guide plate is rotated about the pivot pin.

4 Claims, 4 Drawing Figures

ROUTER GUIDE

CROSS-REFERENCE TO RELATED APPLICATION

This application is a division of my copending U.S. patent application Ser. No. 06/129,175, filed Mar. 10, 1980 now U.S. Pat. No. 4,291,735.

SUMMARY OF THE INVENTION

This invention relates to a router guide to facilitate using the router to cut a circular groove in a workpiece.

For this purpose, the present router guide includes guide plate having a series of openings in the bottom which are spaced apart along a spiral of increasing radius outward from a central opening which receives the router bit. A pivot pin is insertable into a selected one of these bottom openings to provide a pivot about which the guide plate can be turned to move the router bit through the desired circular path for the groove. Preferably, a calibrated gauge is provided for selecting the correct pivot pin location for a circular groove of the desired diameter.

A principal object of this invention is to provide a novel router guide to facilitate using a router to cut a circular groove in a workpiece.

Additional objects and advantages of the present invention will be apparent from the following detailed description of a presently preferred embodiment thereof, which is illustrated in the accompanying drawing.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figure 2:
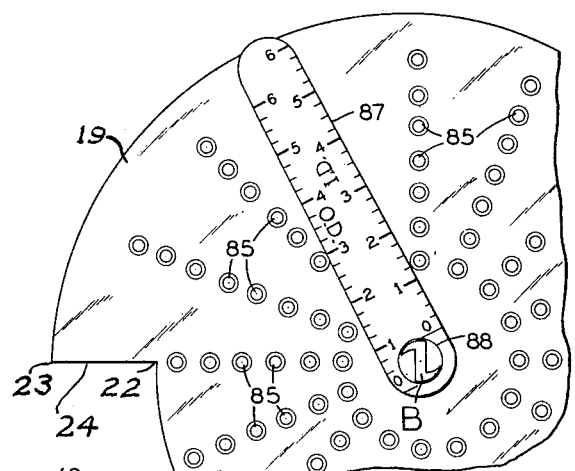
FIG. 2 is a bottom plan view of the guide plate in the present router guide, with one of the gauges applied to it for selecting the location of a pivot pin for the router.
Figure 3:
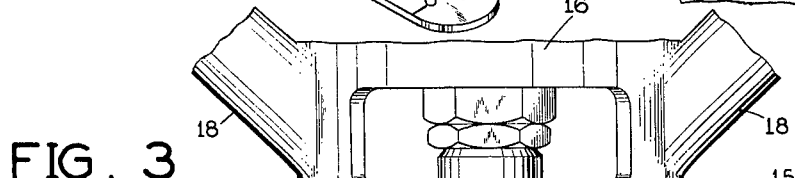
FIG. 3 is a vertical section showing the router overlying the FIG. 2 guide plate and cutting a circular groove in the workpiece, using the pivot pin as a center.
Figure 4:
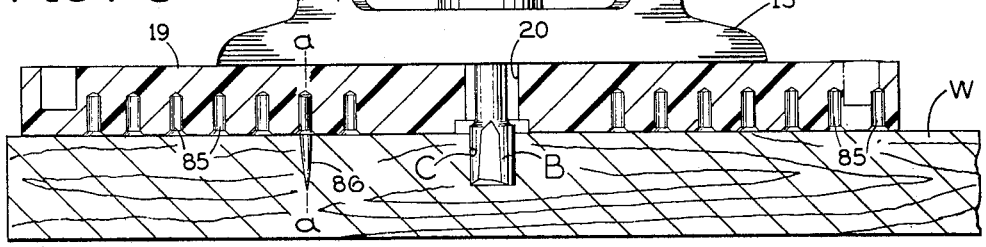
FIG. 4 is a perspective view, with parts broken away for clarity, of a workpiece after a circular groove is cut in it using the router and router guide arrangement shown in FIG. 3.
Figure 4:
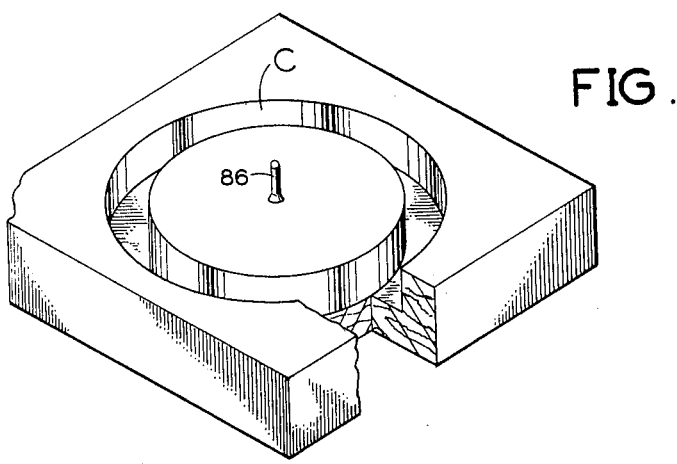

Referring to FIG. 3, a guide plate 19 having an eccentric or cam-shaped periphery (FIG. 2) is releasably clamped to the base 15 of a router having a generally cylindrical housing 16 with upwardly and outwardly extending handles 18 on opposite sides. The clamping arrangement may, for example, be as shown in FIGS. 4 and 7 of my aforementioned U.S. Pat. No. 4,291,735. The router housing 16 encloses an electric motor above (not shown) which drives the router bit B.

Referring to FIG. 2, viewed from the bottom, the guide plate 19 is formed with a counterbored central opening 20 which is aligned axially with the router bit B. As shown in FIG. 3, the bit extends down through this opening. The periphery of the guide plate 19 extends in a smooth spiral curvature from a minimum radius location 22 counterclockwise in FIG. 2 with a progressively increasing radius through an eccentric arc of 360 degrees until it reaches the maximum radius location 23, at which point the periphery of the guide plate extends radially inward along the line 24 to the minimum radius point 22.

The guide plate 19 is formed with a plurality of vertical recesses 85 in the bottom. As shown in FIG. 2, these bottom recesses 85 are arranged in a spiral which has the axis of the central opening 20 in the guide plate 19 as its center. Each turn of this spiral has sixteen such recesses at equal angular distances. Thus, the bottom recesses are arranged along 16 radial lines which are 22½ degrees apart. The successive recesses along each such radial line are ¼ inch apart. Therefore, each successive recess along the spiral is 1/64 inch farther out from the center of the guide plate 19 than the preceding one.

When the router is to be used to cut a circular groove in the workpiece, a pointed pivot pin 86 (FIG. 1) is inserted in the recess 85 which is the desired radial distance from the center of the guide plate 19. This pivot pin has a cylindrical upper end which has a snug sliding fit in each recess 85. The pointed end of the pivot pin 86 is pushed down into the workpiece W (FIG. 3) at the center for the circular groove, and the guide plate 19 is turned around the pivot pin 86, carrying the router with it to cut a circular groove in the workpiece which has the pivot pin as its center.

Figure 1:
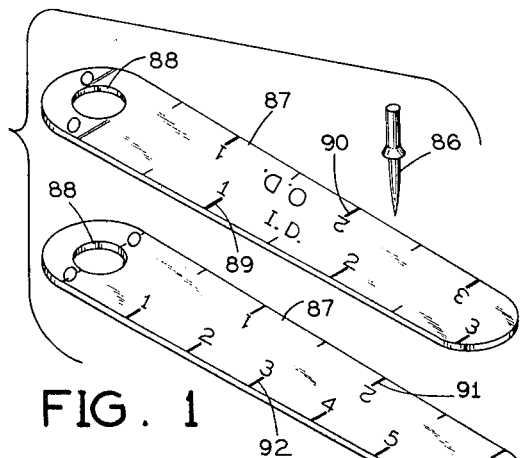
FIG. 1 is a perspective view showing a pivot pin and the opposite faces of a gauge for use with a guide plate in the present router guide.

To facilitate the selection of the proper bottom recess 85 in which to insert the pivot pin 86, a gauge 87 as shown in FIGS. 1 and 2 may be provided. This gauge is a thin, flat blade with a circular opening 88 near one end which fits snugly but slidably over the router bit B as shown in FIG. 2. Along one edge on one face the gauge has a scale 89 marked in increments of distance outward from the near edge of the opening 88. Along the opposite edge on this same face the gauge has a second scale 90 marked in increments of distance outward from the far edge of the opening 88. The user can select one scale or the other, depending upon whether he is working with the inside diameter or the outside diameter measurement of the circular groove to be cut.

The user rotates the gauge 87 about the router bit B until the selected I.D. or O.D. point on the gauge registers with the center of a bottom recess 85 in the guide plate 19. He then inserts the pivot pin 86 in this recess, and this assures him that the circular groove he will cut will have the desired I.D. or O.D.

The opposite face of the gauge 87 (shown in the lower part of FIG. 1) is marked with two scales along its opposite edges, one indicating the radial distance from the center of the opening 88 and the other indicating the diameter of a circle having the center of the opening 88 at its center. These scales are designated by the reference numerals 91 and 92 in the lower half of FIG. 1. The router operator uses this side of the scale if the groove to be cut is specified in terms of its mean radius or mean diameter.

For different diameter router bits B, a series of such gauges 87 may be provided, each having an opening 88 which corresponds to a particular bit size.

It is to be understood that the base plate 19 in the present router guide may be a replacement for the standard router base instead of being releasably attached to the router base.

I claim:

1. For use with a router having a motor-driven bit, the improvement which comprises:
   a flat guide plate for attachment to the router having a central opening for passing the router bit and having a series of openings spaced apart along a spiral of progressively increasing radius which has said central opening as its center;
   and a pivot member having an end which is releasably insertable into a selected one of said series of openings and having a pointed opposite end for insertion in a workpiece at the center for a circular groove to be cut in the workpiece by rotating said guide plate about said pivot member.

2. The combination of claim 1, and further comprising a gauge plate having an opening for snugly receiving the router bit and having a graduated scale extending outward from said last-mentioned opening to measure the location of the selected bottom opening in the guide plate outward from the central opening therein.

3. The combination of claim 2, wherein said gauge plate has a scale along one edge calibrated in distances from the inner edge of said opening in the gauge plate and a scale along the opposite edge calibrated in distances from the outer edge of said last-mentioned opening.

4. The combination of claim 2, wherein said gauge plate has scales along its opposite edges calibrated respectively in terms of the distance from the center of said opening in the gauge plate and twice said distance.

* * * * *